(12) United States Patent
Hajianpour

(10) Patent No.: US 7,975,972 B1
(45) Date of Patent: Jul. 12, 2011

(54) CONVERTIBLE APPARATUS FOR ATTACHING AN ARTICLE TO A WALL

(76) Inventor: Zoya Hajianpour, Fort Lauderdale, FL (US)

(*) Notice: Subject to any disclaimer, the term of this patent is extended or adjusted under 35 U.S.C. 154(b) by 0 days.

(21) Appl. No.: 11/761,615

(22) Filed: Jun. 12, 2007

(51) Int. Cl.
*A45D 42/14* (2006.01)

(52) U.S. Cl. ............... 248/205.5; 248/205.8; 248/206.1; 248/206.2; 248/363; 248/309.3; 248/683; 206/829

(58) Field of Classification Search ............... 248/205.5, 248/205.7, 205.8, 309.3, 363, 206.1, 206.2, 248/683; 206/829; 362/397
See application file for complete search history.

(56) References Cited

U.S. PATENT DOCUMENTS

| | | | |
|---|---|---|---|
| 4,696,447 A | 9/1987 | Strecker | |
| 5,422,803 A * | 6/1995 | Kilgore | 362/392 |
| 5,435,511 A * | 7/1995 | Hsu | 248/206.3 |
| D393,098 S * | 3/1998 | Adams | D26/138 |
| 6,142,432 A | 11/2000 | Amussen | |
| 6,276,649 B1 | 8/2001 | Kruse | |
| 6,308,923 B1 * | 10/2001 | Howard | 248/205.5 |
| 6,402,104 B1 * | 6/2002 | Smith | 248/205.5 |
| 6,550,735 B1 * | 4/2003 | Zheng | 248/304 |
| 6,637,707 B1 * | 10/2003 | Gates et al. | 248/224.7 |
| 7,021,593 B1 * | 4/2006 | Fan | 248/206.2 |
| 7,028,962 B1 * | 4/2006 | Hostetler | 248/309.3 |
| D527,616 S * | 9/2006 | Hajianpour | D8/373 |
| 7,320,450 B2 * | 1/2008 | Carnevali | 248/160 |
| 7,651,063 B2 * | 1/2010 | Jensen | 248/206.2 |
| 7,802,763 B2 * | 9/2010 | Faller et al. | 248/95 |

FOREIGN PATENT DOCUMENTS

WO    WO 2006/076876 A1    7/2006

OTHER PUBLICATIONS

30 Ways to Store More in Your Bath, www.bhg.com, May 26, 2007.
OXO International—Suction Hook, www.oxo.com, May 26, 2007.

* cited by examiner

*Primary Examiner* — Terrell Mckinnon
*Assistant Examiner* — Todd M. Epps
(74) *Attorney, Agent, or Firm* — Ronald V. Davidge

(57) ABSTRACT

An attachment device for attaching an article to a wall surface includes a bracket with an outwardly extending plate having a hole through which an elongated portion of the article can be placed and an attachment plate, perpendicular to the outwardly extending plate, having at least one hole through which the bracket may be attached directly to the wall by a screw. The attachment device additionally includes a housing having a suction cup for attachment to the wall, a coupling for removably receiving the bracket, and an actuator for causing the suction cup to engage and release the wall surface.

8 Claims, 4 Drawing Sheets

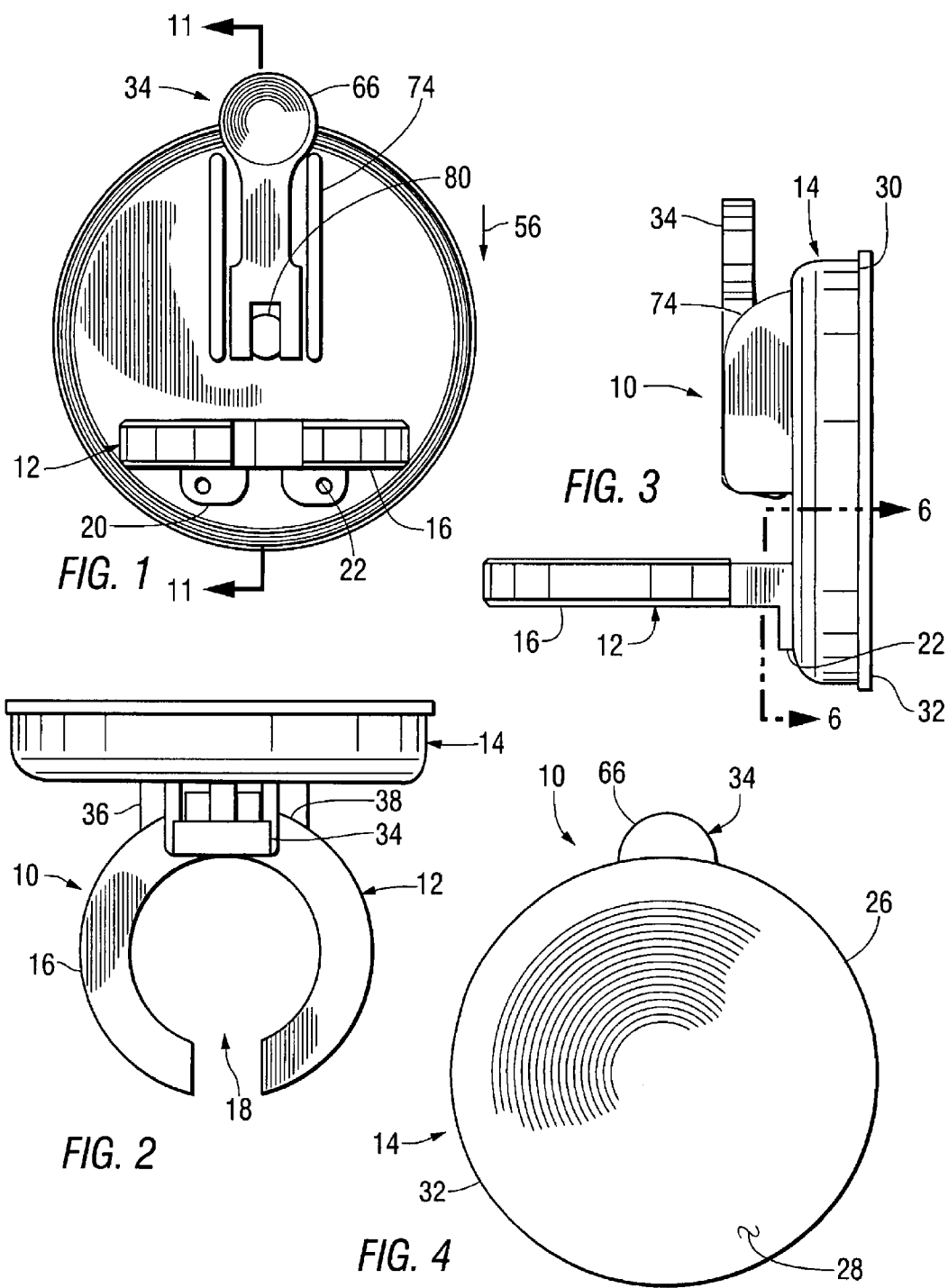

CONVERTIBLE APPARATUS FOR ATTACHING AN ARTICLE TO A WALL

BACKGROUND OF THE INVENTION

1. Field of the Invention

This invention relates to a bracket for removably attaching an article to a wall, and, more particularly, to a bracket that is convertible between screw attachment to the wall and attachment by means of a suction cup.

2. Summary of the Background Art

Attachment brackets are widely used for holding an article, such as a hair dryer in an easily accessed position on a wall, with the bracket being attached to the wall by a number of screws. Other forms of attachment brackets include suction cups, providing for attachment without damaging the surface of the wall, and for relatively easy movement of the bracket from one wall surface to another. The use of a suction cup allows the bracket to be used in a rented building or even in a temporary dwelling, such as a hotel, to be subsequently removed without damage to the wall. Furthermore, a suction cup may be readily attached to surfaces, such as bathroom tiles, through which drilling holes for screw attachment is particularly difficult.

The patent literature includes a number of descriptions of devices using suction cups to hold articles to a wall. For example, a design patent, U.S. Pat. No. D527,616, describes an article holder having a suction cup, an outwardly extending plate for holding an article, and an actuating lever for deflecting the suction cup so that the article holder is attached to the wall or released therefrom. U.S. Pat. No. 6,142,432 describes a device for holding an article at an adjustable angle, with a suction cup attaching the device to a wall. U.S. Pat. No. 6,402,104 describes a device including a suction cup, and an actuating lever for engaging and releasing the suction cup with a wall, in which the actuating lever has coupling surfaces engaging one of several brackets used to hold articles. U.S. Pat. No. 6,276,649 describes a triangular plate using several suction cps to hold a satellite dish antenna to a flat surface, such as a window. An international patent application, WO 2006/076876 A1, describes a suction cup attachment device using an actuator operated by means of a screw thread to attach the device to a flat surface or to release the device therefrom, by turning the housing as a knob.

It is desirable to provide for screw attachment to a wall surface in addition to attachment by means of one or more suction cups. To this end, U.S. Pat. No. 4,696,457 describes an article holder including three suction cups and one or more holes for attachment screws within the plate to which the suction cups are attached. However, what is needed is a device including a coupling holding a bracket that can be easily removed from the device and attached directly to a wall surface using attachment screws, so that the bracket can be used in this way without the bulky apparatus including the suction cup(s).

SUMMARY OF THE INVENTION

In accordance with a first aspect of the invention, apparatus is provided for attaching an article to a wall. The apparatus includes a bracket and a housing. The bracket includes an outwardly extending plate having a first opening for receiving an elongated portion of the article and an attachment plate extending perpendicular to the outwardly extending plate, with the attachment plate including at least one hole for a screw to attach the bracket to a wall. The housing includes a coupling removably engaging the bracket to attach the bracket to attach the bracket to the housing. The housing additionally includes a suction cup having a concave rear surface.

Preferably, the housing additionally includes an annular surface extending adjacent an peripheral portion of the suction cup, and an actuator. The actuator is movable between a first position and a second position to increase the curvature of the concave rear surface of the suction cup with the peripheral portion of the suction cup being held against the annular surface of the housing.

Preferably, the actuator includes a lever pivotally mounted on the housing and additionally attached to a central portion of the suction cup. For example, the housing includes a front wall extending in front of the suction cup, with the front wall including a central hole, while the actuator additionally includes an actuator shaft extending outward through the central hole, attached to the central portion of the suction cup and additionally connected to the lever. The actuator shaft may be slidably mounted within the central hole and pivotally attached to the lever, with lever being mounted to slide in a direction perpendicular to the actuator shaft with pivotal movement of the lever.

Preferably, the bracket slides along the coupling as the bracket is moved in a first direction along the coupling until a motion limiting surface of the bracket engages the coupling to prevent further movement of the bracket on the coupling. Additionally, the bracket may slide along the coupling as the bracket is moved opposite the first direction along the coupling until the motion limiting surface of the bracket engages the coupling to prevent further movement of the bracket on the coupling.

Preferably, the first opening within the outwardly extending plate includes a slot extending through the outwardly extending plate. The apparatus may additionally include an adapter plate attached to the outwardly extending plate to provide a second opening, smaller than the first opening, for receiving an elongated portion of the artic

BRIEF DESCRIPTION OF THE FIGURES

FIG. 1 is a front view of an attachment device for removably attaching an article to a wall;

FIG. 2 is a plan view of the attachment device of FIG. 1;

FIG. 3 is a right elevation the attachment device of FIG. 1;

FIG. 4 is a bottom plan view of the attachment device of FIG. 1;

DETAILED DESCRIPTION OF THE INVENTION

Figure 5:
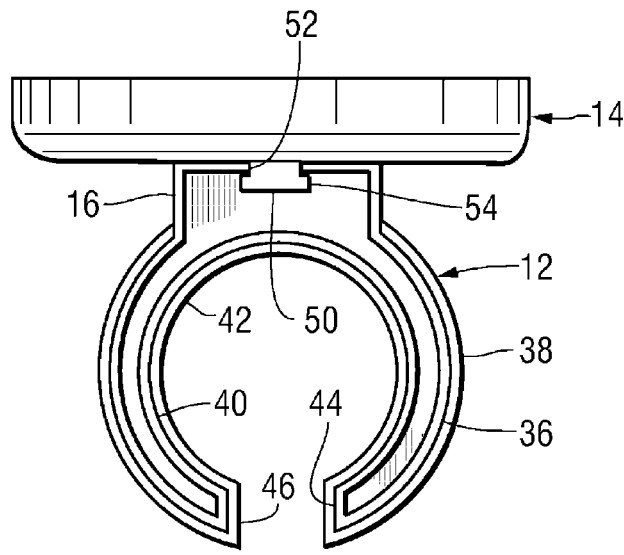
FIG. 5 is a fragmentary front cross-sectional elevation of the attachment device of FIG. 1, taken as indicated by section lines 5-5 in FIG. 3.

External features of an attachment device 10 built in accordance with the invention will first be discussed with reference being made to FIGS. 1-3. FIG. 1 is a front view of the attachment device 10, while FIG. 2 is a plan view thereof, and while FIG. 3 is a right elevation thereof. The left elevation of the attachment device 10 is a mirror image of the right elevation shown in FIG. 3. The device 10 includes a bracket 12 and a housing 14. The bracket 12 includes an outwardly extending plate 16 having a first opening 18 for receiving an elongated portion of the article. For example, a handle portion of a hairdryer may be inserted within the first opening 18 to extend downward from the outwardly extending plate 16. The bracket 12 additionally includes an attachment plate 20 extending perpendicular to the outwardly extending plate 16, with the attachment plate 20 including at least one hole 22 for a screw (not shown) used to attach the bracket 12 to a wall.

FIG. 4 is a rear view of the attachment device 10. The housing 14 additionally includes a suction cup 26. having a concave rear surface 28. Preferably, the housing additionally includes an annular surface 30 (shown in FIG. 2) extending adjacent a peripheral portion 32 of the suction cup 26, and an actuator 34, which is moved to deflect the suction cup 26 in a manner causing a partial vacuum to be formed between the concave rear surface 28 of the suction cup 26 and a wall against which the attachment device 10 is held.

FIG. 5 is a bottom plan view of the attachment device 10, showing that the outward extending plate 16 includes a base plate 36 and an adapter plate 38, which is placed over the base plate 36. When the adapter plate 38 is removed from the attachment device 10, a first opening 40 is provided for holding the extended portion of an article. When the adapter plate 38 is placed over the base plate 36, as shown in the figures, a second opening 42, which is smaller than the first opening 40, is provided for holding the extended portion of the article (not shown). Thus, the adapter plate 38 is installed or removed to change the size of the opening so that various types of articles can be properly held. Preferably, the first opening 40 includes a slot 44 extending outwardly through the base plate 36, while the second opening 42 includes a slot 46 extending outwardly through the adapter plate 38. The slots 44, 46 facilitate the placement of an extended portion of an article from which an electrical cord extends, such as the handle of a typical hair dryer, into the openings 40, 42 and the removal of such an extended portion of an article therefrom.

Figure 6:
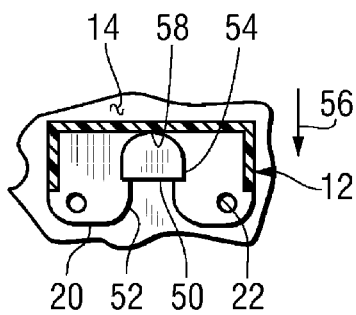
FIG. 6 is a plan view of a bracket within the attachment device of FIG. 1.
Figure 7:
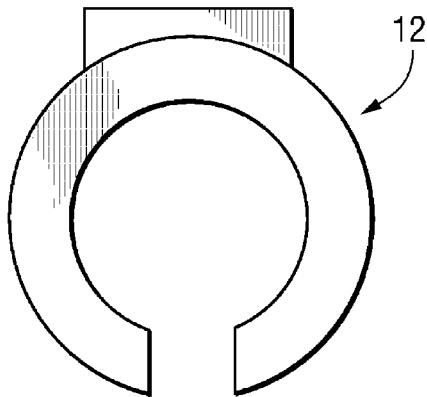
FIG. 7 is a bottom plan view of the bracket of FIG. 6.
Figure 8:
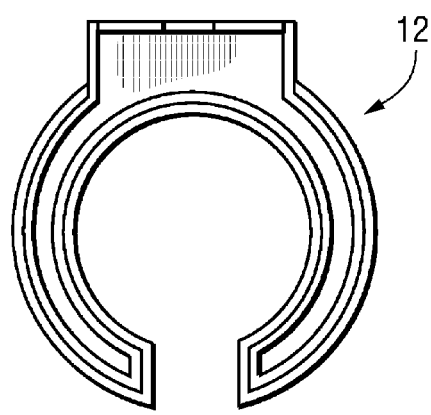
FIG. 8 is a front elevation of the bracket of FIG. 6.
Figure 9:
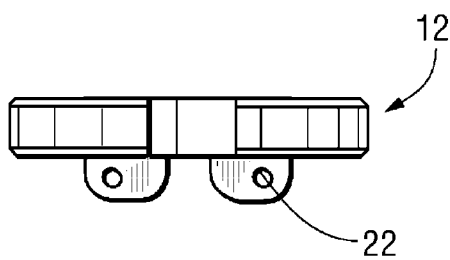
FIG. 9 is a rear elevation of the bracket of FIG. 6.
Figure 10:
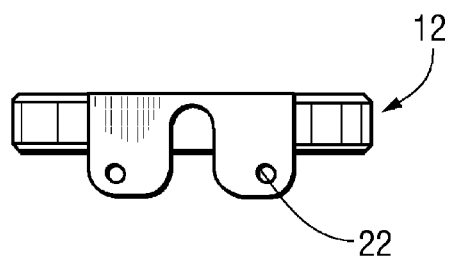
FIG. 10 is a cross-sectional right elevation of the attachment device of FIG. 1, showing a lever therein in a first position.

FIG. 6 is a fragmentary cross-sectional front elevation of the attachment device 10, taken as indicated by section lines 6-6 in FIG. 3 to show a coupling 50 releasably engaging the bracket 12 to attach the bracket 12 to the housing 14. Referring to FIGS. 5 and 6, the coupling 50 is disposed within, a slot 52 in the attachment plate 20 of the bracket 12, with ears 54 of the coupling 50 extending laterally outward along the attachment plate 20 to hold the bracket 12 in place. Thus, the bracket 12 is installed on the housing 14 by sliding the bracket 12 along the coupling 50 in the first direction of arrow 56 until a motion limiting surface 58 of the bracket 12 engages the coupling 50 to prevent further movement of the bracket 12 along the coupling 50. For example, the motion limiting surface 58 may be formed by a lower surface of the outwardly extending plate 16 or by a surface of the slot 52.

In accordance with the invention, the bracket 12 is configured so that it can be removed from the housing 14, by being pulled upward, opposite the direction of arrow 56, and the attached directly to a wall surface by screw(s) extending through at least one hole 22 within the attachment plate 20. The bracket 12, removed from the housing 14 for direct attachment to a wall surface, is shown in FIGS. 7-10, with FIG. 7 being a plan view of the bracket 12, with FIG. 8 being a bottom plan view thereof, with FIG. 9 being a front elevation thereof, with FIG. 10 being a rear elevation thereof. The attachment device 10 is thus provided with an advantage over prior art devices in that the bracket 12 can be easily removed from the housing 14 and directly attached to a wall using one or more screw(s), with the bulk of the housing 14 being eliminated.

Figure 11:
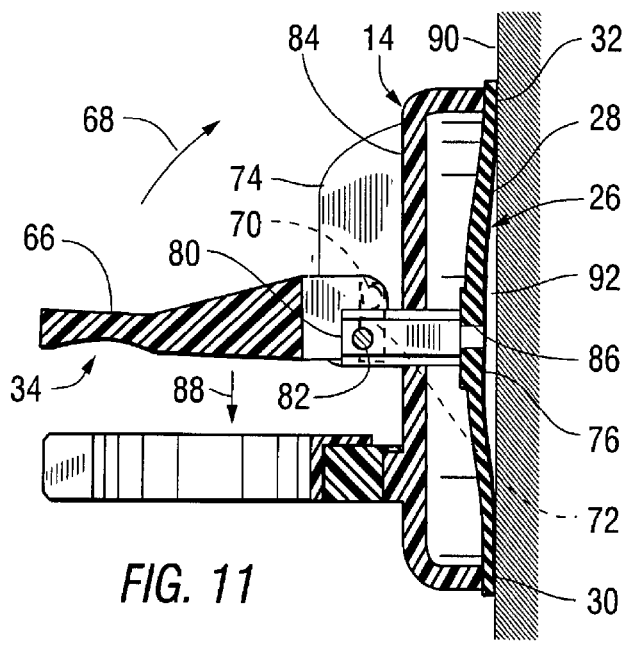
FIG. 11 is a cross-sectional plan view of the attachment device of FIG. 1, taken as indicated by section lines 12-12 in FIG. 1.
Figure 12:
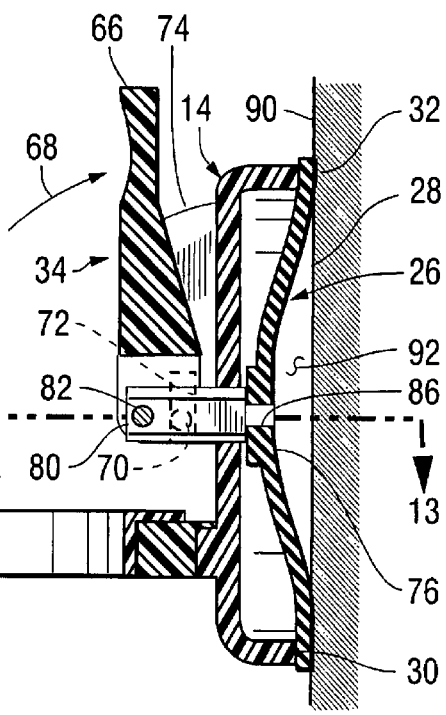
FIG. 12 is a front elevation of an alternate configuration of an attachment device for removably attaching an article to a wall.

The operation of the actuator 34 to increase a level of suction between the concave rear surface 28 of the suction cup 26 and a wall surface will now be discussed, with reference being made to FIGS. 11-13. FIGS. 11 and 12 are cross-sectional right elevations of the attachment device 10, each taken as indicated by section lines 11-11 in FIG. 1. The actuator 34 includes a lever 66, which is movable in the direction of arrow 68 between a first position, as shown in FIG. 11, and a second position, as shown in FIG. 12 to increase the curvature of the concave rear surface 28 of the suction cup 26 with the peripheral portion 32 of the suction cup being held against the annular surface 30 of the housing 14.

Figure 13:
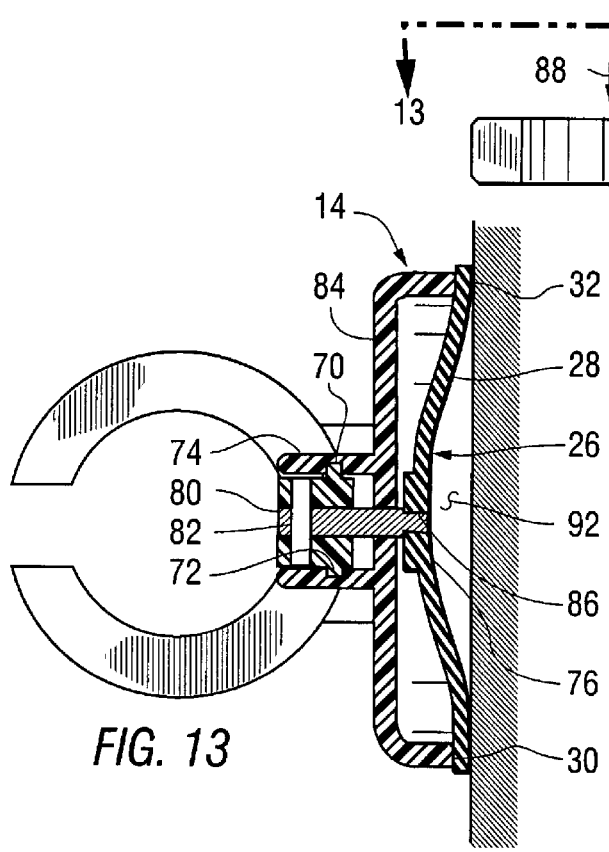
FIG. 13 is a fragmentary cross-sectional front elevation of the attachment device of FIG. 12.

FIG. 13 is a cross-sectional plan view of the attachment device 10, taken as indicated by section lines 13-13 in FIG. 12. The lever 66 is pivotally mounted on the housing 14 by means of pin portions 70 of the lever 68 extending within grooves 72 in tabs 74 extending outward as part of the housing 14. The lever 68 is additionally pivotally attached to a central portion 76 of the suction cup 26 by means of an actuator shaft 80 attached to the suction cup 26 and by means of a pivot pin 82. The housing 14 includes a front wall 84 extending in front of the suction cup 26, with the front wall 84 including a central hole 86 The actuator shaft 80 is slidably mounted within the central hole 86, while the pin portions 70 of the lever 66 are mounted to slide within the grooves 72 in the direction of arrow 88, perpendicular to the actuator shaft 80, with pivotal movement of the lever 66 in the direction of arrow 6. The process of attaching the attachment device 10 to a wall surface 90 begins with placing the device 10 against the wall surface 90, with the lever 66 in the first position, as shown in FIG. 11, and with the peripheral portion 32 of the suction cup 26 being held between the annular surface 30 of the housing 14 and the wall surface 90. Then, as the lever 66 is pivoted in the direction of arrow 68, an increase in the concave curvature of the rear surface 28 of the suction cup 26 causes an increase in the volume of a space 92 between the rear surface 28 and the wall surface 90, so that a decrease in pressure within this space 92 results in a force holding the attachment apparatus in place on the wall surface 90. As the lever 66 is moved in the direction of arrow 68, air is allowed to escape from a space 94 between the suction cup 26 and the front wall 84 of the housing 14 through a space between the actuator shaft 80 and the central hole 86 within the front wall 84, or through additional openings in the housing 14 (not shown). This process is reversed to facilitate removal of the attachment device 10 from the wall surface 90, with the lever 66 being pivoted opposite the direction of arrow 68, so that the volume of the space 92 between the suction cup rear surface 28 and the wall surface 12 is reduced, as shown in FIG. 11.

Figure 14:
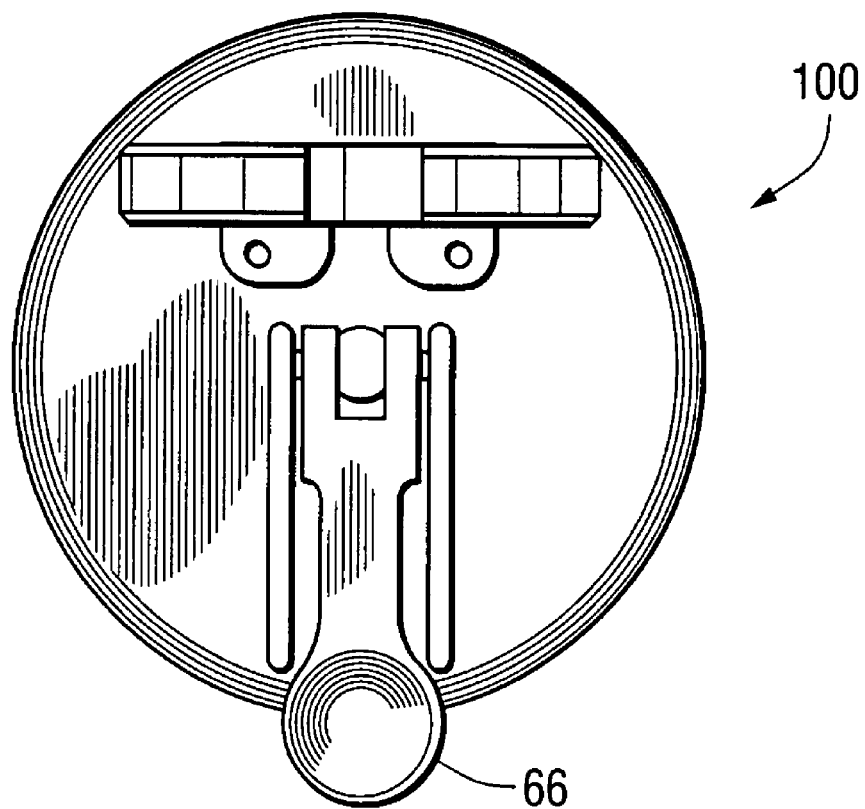
FIG. 14 is a front elevation of an alternate configuration of an attachment device.
Figure 15:
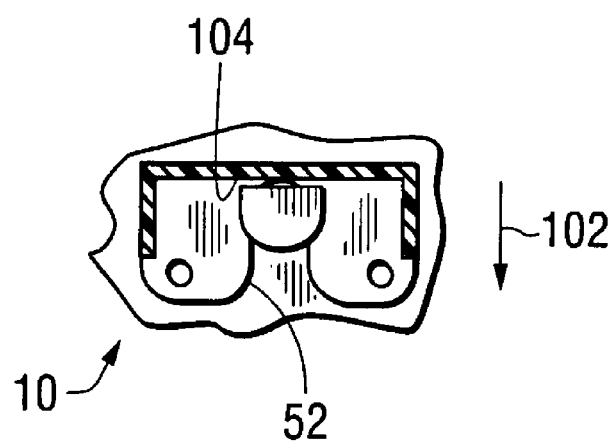
FIG. 15 is a fragmentary cross-sectional elevation of the alternate configuration of FIG. 14.

Preferably, the components of the attachment device 10 are configured to allow assembly in an alternate configuration, having the bracket 12 disposed above, instead of under the lever 34 by being inverted relative to the rest of the attachment device will now be discussed in reference to FIGS. 14 and 15, with the bracket 12. FIG. 14 is a front elevation of the alternate configuration 100 of attachment device, showing the lever 66 disposed above the bracket 12. FIG. 15 is a fragmentary cross-sectional elevation of the alternate configuration 100, taken in a manner similar to FIG. 6.

To form the alternate configuration 100, the slot 52 of the bracket 12 is slid along the coupling 50 in the direction of arrow 102. Motion of the bracket 12 is stopped by a motion limiting surface, which may be part of the slot 52 or the underside surface 104 of the bracket 12. Thus, the various elements described herein can be used to construct either the configuration of the attachment device 10 or the alternate configuration 100, allowing the actuating the lever 66 to be placed above the bracket to simplify movement of the attachment device from one surface to another or below the bracket to move the lever 66 of a space above the bracket 12 to facilitate handling an article being placed within the bracket.

While the invention has been shown and described in a preferred embodiment with some degree of particularity, it is understood that this has been done only by way of example, and that many changes can be made without departing from the spirit and scope of the invention, as defined in the appended claims.

What is claimed is:

1. Apparatus for attaching an article to a wall of a structure, comprising:
    a housing including a coupling, a suction cup disposed along a rear surface of the housing, and a front wall extending in front of the suction cup, wherein the suction cup has a concave rear surface, and
    a bracket removably attached to the housing by the coupling, wherein the bracket includes an outwardly extending plate having a first opening for receiving an elongated portion of the article and an attachment plate extending along the front wall of the housing, perpendicular to the outwardly extending plate, wherein the bracket slides along the coupling as the bracket is moved in a first direction along the front wall of the housing until a motion limiting surface of bracket engages the coupling to prevent further movement of the bracket on the coupling with a portion of the attachment plate of the bracket being held between a portion of the coupling and the front wall of the housing, wherein the attachment plate includes a plurality of holes, spaced apart along a surface of the attachment plate, and wherein the bracket, when removed from the housing, is attachable to the wall of a structure by screws extending through the plurality of holes in the attachment plate.

2. The apparatus of claim 1, wherein the housing additionally includes: an annular surface extending adjacent an peripheral portion of the suction cup; and an actuator movable between a first position and a second position to increase the curvature of the concave rear surface of the suction cup with the peripheral portion of the suction cup being held against the annular surface of the housing.

3. The apparatus of claim 2, wherein the actuator includes a lever pivotally mounted on the housing and attached to a central portion of the suction cup.

4. The apparatus of claim 3, wherein
    the housing includes a front wall extending in front of the suction cup, having a central hole;
    the actuator additionally includes an actuator shaft extending outward through the central hole, attached to the central portion of the suction cup and connected to the lever.

5. The apparatus of claim 4, wherein
    the actuator shaft is slidably mounted within the central hole and pivotally attached to the lever,
    the lever is mounted to slide in a direction perpendicular to the actuator shaft with pivotal movement of the lever by at least one pivot pin attached to the lever and moving within a groove in the housing.

6. The apparatus of claim 1, wherein the bracket additionally slides along the coupling as the bracket is moved opposite the first direction along the coupling with a portion of the attachment plate of the bracket being held between a portion of the coupling and the front wall of the housing until the motion limiting surface of the bracket engages the coupling to prevent further movement of the bracket on the coupling.

7. The apparatus of claim 1, wherein the first opening includes a slot extending through the outwardly extending plate.

8. The apparatus of claim 1, additionally including an adapter plate attached to the outwardly extending plate to provide a second opening, smaller than the first opening, for receiving an elongated portion of the article.

\* \* \* \* \*